United States Patent [19]

Lester et al.

[11] Patent Number: 5,229,553
[45] Date of Patent: Jul. 20, 1993

[54] ACOUSTIC ISOLATOR FOR A BOREHOLE LOGGING TOOL

[75] Inventors: Robert A. Lester; Gregory J. Wilkinson, both of Houston, Tex.

[73] Assignee: Western Atlas International, Inc., Houston, Tex.

[21] Appl. No.: 970,674

[22] Filed: Nov. 4, 1992

[51] Int. Cl.⁵ ............................................. G01V 1/40
[52] U.S. Cl. ...................................... 181/102; 367/25
[58] Field of Search ............................. 181/102–105; 367/25, 911; 73/151

[56] References Cited

U.S. PATENT DOCUMENTS

| | | | |
|---|---|---|---|
| 3,288,245 | 11/1966 | Anderson | 181/102 |
| 4,446,539 | 5/1984 | von Bose | 181/102 |
| 4,516,228 | 5/1985 | Zemanek, Jr. | 367/75 |
| 4,872,526 | 10/1989 | Wignall et al. | 181/102 |

OTHER PUBLICATIONS

Sales Brochure "Multiple Array Acoustilog" [MAC], Atlas Wireline Services.

*Primary Examiner*—Ian J. Lobo
*Attorney, Agent, or Firm*—William A. Knox

[57] ABSTRACT

An acoustic isolator for use with a logging-tool assembly for generating both flexural wavefields and compressional wavefields in the sidewall formations encountered by a borehole. The acoustic isolator is subflexible and is composed of a plurality of individual vertebrate links. The links are made up of a plurality of spools laid out end-to-end in tandem. The spools have upset end portions. The upset end portions of each pair of adjacent spools are externally gripped by a split shells having internal recesses that fit over the upset end portions of the spools.

4 Claims, 7 Drawing Sheets

ACOUSTIC ISOLATOR FOR A BOREHOLE LOGGING TOOL

BACKGROUND OF THE INVENTION

1. Relation to Other Applications

This application is related to application Ser. No. 07/971225, filed concurrently herewith and assigned to the assignee of this invention.

2. Field of the Invention

Disclosed is an acoustic isolator for use with an acoustic downhole logging sonde that is used for measuring certain rock parameters indicative of selected properties of the sidewall material of a borehole. The isolator inhibits sonic crossfeed between a transmitter and a receiver that are mounted at opposite ends of the sonde.

3. Discussion of Related Art

Acoustic logging tools for measuring properties of the sidewall material of both cased and uncased boreholes are well known. Essentially such tools measure the travel time of an acoustic pulse propagating through the sidewall material over a known distance. In some studies, the amplitude and frequency of the acoustic pulse, after passage through the earth, are of interest.

In its simplest form, an acoustic logger consists of one or more transmitter transducers that periodically emit an acoustic pulse into the formation around the borehole. One or more receiver transducers, spaced apart by a known distance from the transmitter, hears the pulse after passage through the surrounding formation. The difference in time between pulse transmission and pulse reception divided into the distance between the transducers is the formation velocity. If the transducers do not contact the borehole sidewall, allowance must be made for time delays through the borehole fluid.

Throughout this disclosure, the term "velocity", unless otherwise qualified, shall be taken to means the velocity of propagation of an acoustic wavefield through an elastic medium. The term does not mean the velocity of motion of a medium.

Acoustic wavefields propagate through elastic media in different modes. The modes include: Compressional or P-waves, wherein particle motion is in the direction of wave travel; transverse shear or S-waves, which, assuming a homogeneous, isotropic medium, may be polarized in two orthogonal directions, with motion perpendicular to the direction of wave travel; Stonley waves, which are guided waves that progagate along the fluid-solid boundary of the borehole; and compressional waves that propagate through the borehole fluid itself. There also exist asymmetrical flexural waves as will be discussed later.

P-waves propagate through both fluids and solids. Shear waves cannot exist in a fluid. Compressional waves propagating through the borehole fluid may be mode-converted to shear waves in the borehole sidewall material by refraction provided the shear-wave velocity of the medium is greater than the compressional-wave velocity of the borehole fluids. If that is not true, then shear waves in the sidewall material can be generated only by direct excitation.

Among other parameters, the various modes of propagation are distinguishable by their relative velocities. The velocity of compressional and shear waves is a function of the elastic constants and the density of the medium through which the waves travel. The S-wave velocity is, for practical purposes, about half that of P-waves. Stonley waves may be somewhat slower than S-waves. Compressional wavefields propagating through the borehole fluid are usually slower than formational shear waves but for boreholes drilled into certain types of soft formations, the borehole fluid velocity may be greater than the sidewall formation S-wave velocity. The velocity of flexural waves is said to approach the S-wave velocity as an inverse function of the acoustic excitation frequency. Some authors refer to flexural waves as pseudoRaleigh waves.

In borehole logging, a study of the different acoustic propagation modes provides diagnostic information about the elastic constants of the formation, rock texture, fluid content, permeability, rock fracturing, the goodness of a cement bond to the well casing and other data. Typically, the output display from an acoustic logging tool takes the form of time-scale recordings of the wave train as seen at many different depth levels in the borehole, each wave train including many overlapping events that represent all of the wavefield propagation modes. For quantitative analysis, it is necessary to isolate the respective wavefield modes. S-waves are of particular interest. But because the S-wave arrival time is later than the P-wave arrival time, the S-wave event often is contaminated by later cycles of the P-wave and by interference from other late-arriving events. Therefore, known logging tools are designed to suppress undesired wavefields either by judicious design of the hardware or by post-processing using suitable software.

J. Zemaneys, in U.S. Pat. No. 4,516,228, issued May 7, 1985 provides a borehole logging system that employs a compressional wave transmitter and a direct-excitation shear wave transmitter. The transmitters are alternately fired to impart compressional and shear waves in the surrounding borehole formations. A single bender-bar receiver, spaced apart from the transmitter in the borehole is alternately gated so that the voltages across its pair of piezoelectric planar surfaces are subtracted during the expected period of compressional wave output and added during the expected arrival time period of asymmetrical motion of the receiver to provide shear wave output.

As is well known, the acoustic transmitter and the acoustic receivers are mounted at opposite ends of a logging sonde. The body of the sonde is usually of a suitable metal such as stainless steel or the like which is acoustically conductive. Therefore, in order to prevent unwanted acoustic energy traveling up the sonde from interfering with desired acoustic energy propagating through the formation, is it required that an acoustic isolator be inserted in the sonde between the transmitter and the receivers.

U.S. Pat. No. 3,288,245, issued Nov. 29, 1966 to T. O. Anderson, describes a rigid acoustic isolator for a logging tool that employs a liquid/solid interface whose acoustic mismatch provides the desired acoustic isolation between the transmitter and the receiver modules of the logging tool.

U.S. Pat. No. 4,872,526, issued Oct. 10, 1989 to A. Wignall et al. for a Sonic Well Logging Tool Longitudinal Wave Attenuator that consists of first and second outer housings and an inner housing disposed within the first and second outer housings. A first attenuation member is disposed between the first outer housing and the inner housing and a second attenuation member is disposed between the second outer housing and the inner housing. Each of the attenuation members consists of a plurality of rubber washers interleaved with a plurality of steel washers. The attenuation members are fitted between a flange of the respective outer housings and a flange on each end of the inner housing.

There is a need for an acoustic isolator that will be sufficiently flexible to pass through deviated boreholes yet sufficiently rigid to avoid buckling upon encountering an obstruction in the hole as well as to provide axial rotational stability for the modules that make up the sonde as a whole.

SUMMARY OF THE INVENTION

The acoustic logging tool assembly of this invention is comprised of an elongated sonde that includes a plurality of segments that are rotatable relative to each other. A first driver transducer is mounted in a first segment for launching a dipolar beam toward the sidewall of a borehole along a selected azimuth and along its complement for exciting asymmetrical flexural waves in the sidewall material. A first dipolar receiver is mounted in a second segment, oriented parallel to the selected azimuth for receiving acoustic waves due to the propagation of flexural waves through the sidewall material. A second transmitter transducer and a second dipolar receiver transducer are mounted respectively in third and fourth segments which may be rotated in quadrature and optionally in parallel with the first and second segments.

This invention fulfills an operational need by insuring that the first and third segments containing the transmitter transducers are acoustically isolated from the second and fourth segments containing the receiver transducers. The sub-flexible acoustic isolator consists of a plurality of vertebrate links composed of a plurality of spools arranged end-to-end in tandem configuration. The spools are encased by resilient boots. A plurality of split shells interconnect the spools by externally gripping the boots covering the end portions of the respective adjacent spools. Termination means are provided for interconnecting the isolator with other modules. Key means associated with the split shell section and the resilient boots prevent relative axial rotation between the vertebrate links.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
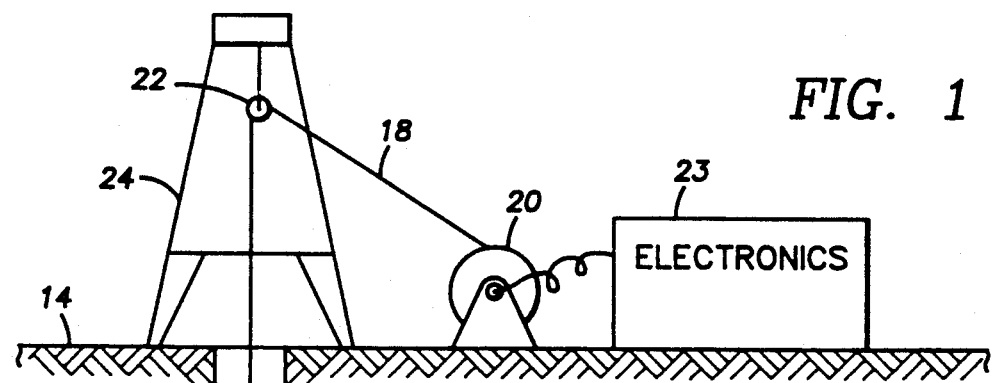
FIG. 1 is a schematic illustration of the sonde of this invention as employed in a borehole.

FIG. 1 shows a borehole 10 drilled into the earth 12. The borehole is usually filled with a drilling fluid that is used to lift drill cuttings to the surface 14 of the earth. It is of economic interest to measure selected parameters of the subsurface formations. To that end, a well-logging sonde assembly, generally shown as 16, is lowered into the borehole 10 on the end of a cable 18 from a draw works 20 over a depth-measuring sheave 22 that is supported from derrick 24. Instrumentation of any suitable type is provided at the surface, electronics 23 and/or in the sonde, such as at 25, to process and record the data gathered by one or more sensors, such as by an acoustic transmitter transducer assembly 26 and an acoustic receiver transducer assembly 28, mounted in sonde 16. The transmitter and receiver assemblies are isolated from each other by an acoustic isolator 29. In some operations, such as for highly-deviated boreholes, the sonde may be supported from flexible tubing or drill pipe.

In a typical operating cycle, transmitter assembly 26 is triggered to insonify sidewall 30 of well bore 10. The acoustic wavefield propagates through the formation, i.e. the earth around the borehole. Its arrival is detected by receiver assembly 28 a few hundreds or thousands of microseconds later. As previously explained, the slowness in terms of microseconds of wavefield travel time per unit of length is one parameter of interest. The physical principles governing propagation of asymmetrical flexural waves in contrast to omni-directional compressional waves is well known, hence, further exegesis is unnecessary.

Figure 2A:
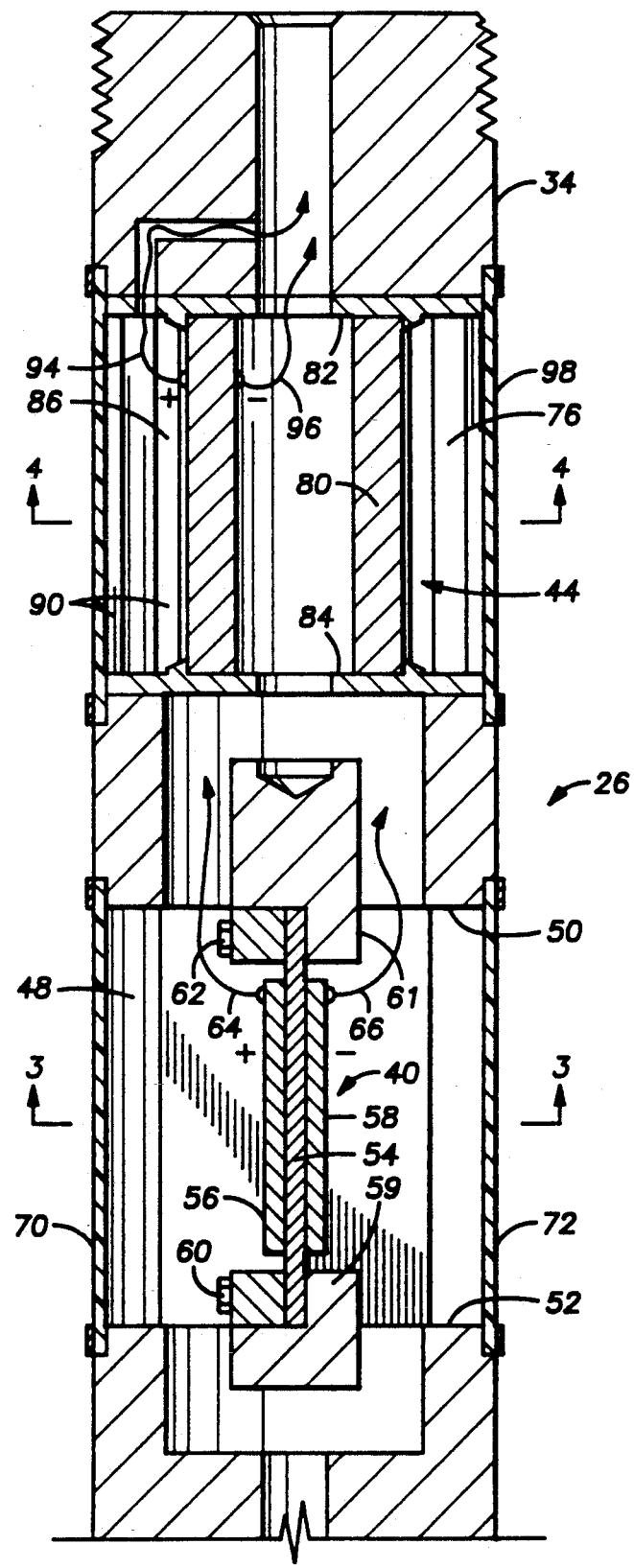
FIGS. 2A and 2B show the construction of the transmitter assembly.
Figure 2B:
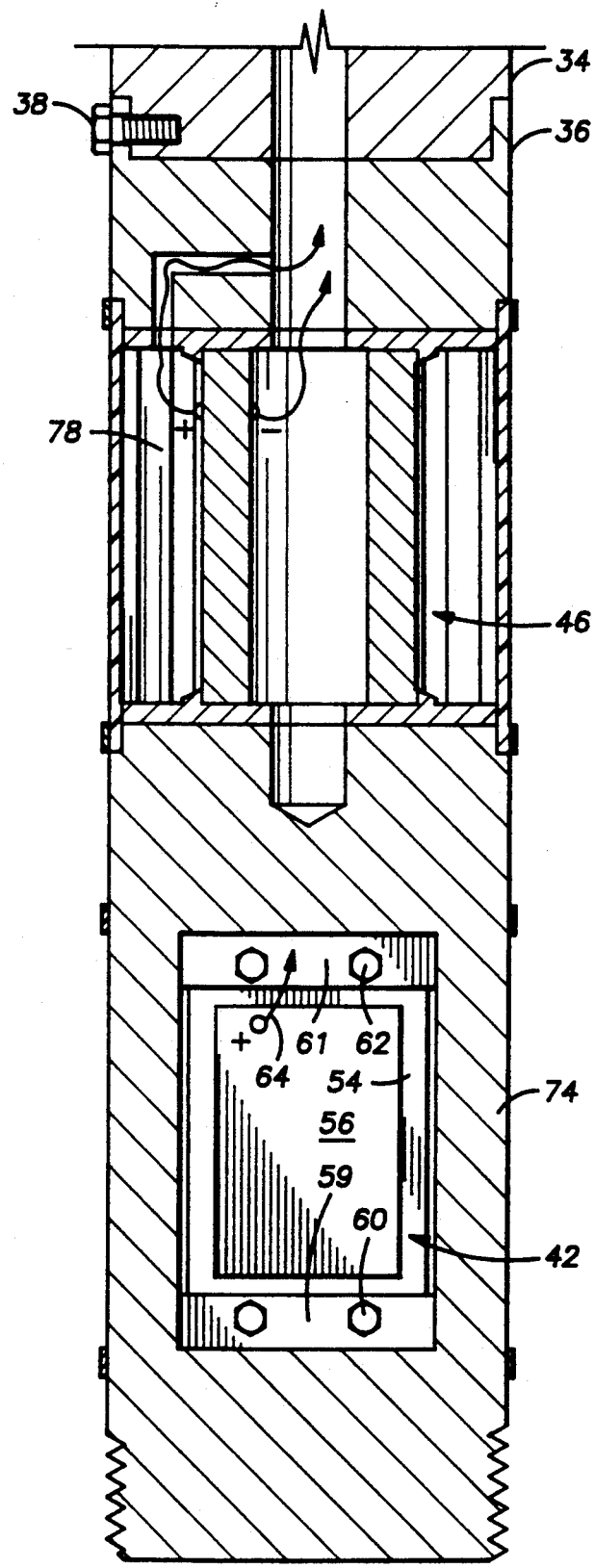

The above paragraphs are a general overview of the function of an acoustic logging tool. Let us now examine the specific novel features of this invention. FIGS. 2A and 2B (shown in two halves for illustrative clarity) show the transmitter assembly 26 which includes two segments or modules 34 and 36. Modules 34 and 36 are axially rotatable relative to each other and may be locked into a desired configuration by one or more locking bolts such as 38. Each one of the modules 34 and 36 contains respectively, a dipole transmitter transducer 40, 42 and a monopole transmitter transducer 44, 46 (referred to hereinafter for simplicity as a dipole unit and a monopole unit). The respective units are spaced one to two feet apart along the modules. The body of the transmitter assembly is made of suitable material such as stainless steel, on the order of three to four inches in diameter and five or six feet long. Each module has two compartments, one for containing a dipole unit and one for containing monopole unit. Axial longitudinal bores through the modules communicate with the compartments to furnish means for the passage of electrical leads and for filling the compartments with an acoustic coupling fluid. The ends of the transmitter assembly are threaded for mating the transmitter assembly to other assemblies on the sonde as needed.

Figure 3B:
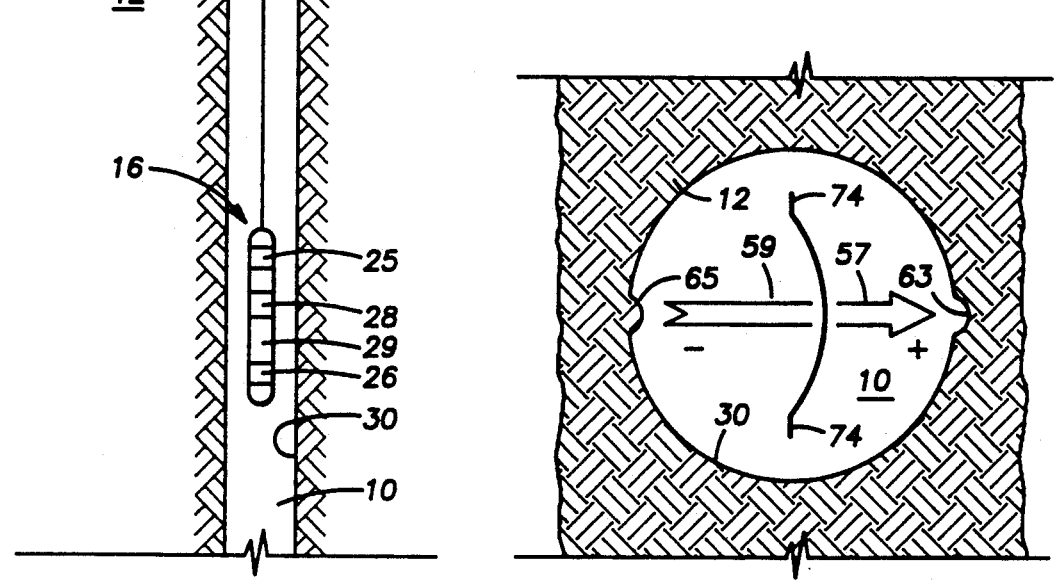
FIG. 3B is a symbolic cross section of a borehole showing the mechanism of flexural wave generation.
Figure 3:
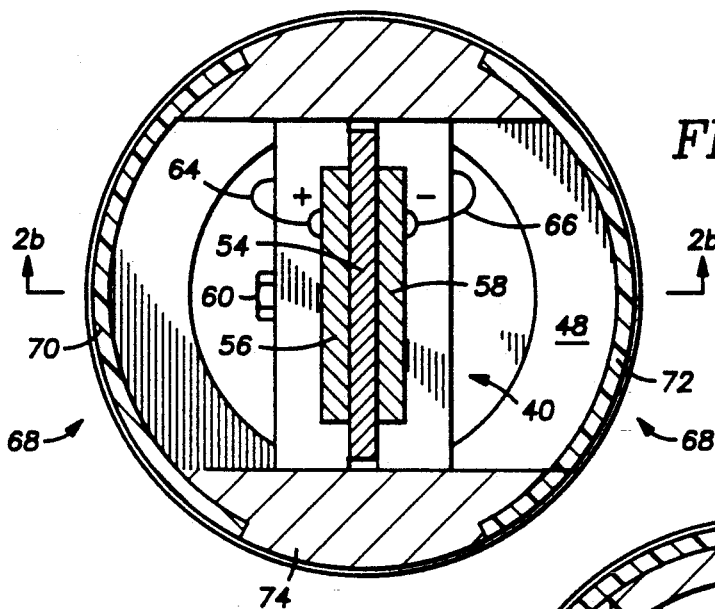
FIG. 3A is a cross section along lines 3—3 of FIG. 2A.

Referring now to FIGS. 2A and 2B and also to FIG. 3 which is a cross section along line 3—3 of FIG. 2A, dipole unit 40 in module 34 is shown rotated 90° (is in quadrature) with respect to dipole unit 42 in module 36.

The two dipole units could, of course be optionally rotated in parallel alignment with each other. Dipole units 40 and 42 and their mounting arrangement are substantially identical; common reference numbers will be used to designate common parts.

The dipole units 40 and 42 are mounted in a compartment such as 48 that is arranged parallel to the longitudinal axis of the sonde. The compartments have internal opposite end portions 50 and 52 as shown in FIG. 2A. A dipole bender-bar transmitter unit such as 40 consists of a rectangular inert element 54 of suitable material having a low coefficient of thermal expansion such as Kovar, the principle axes (meaning the length and width) of which are about two inches by four inches and about 0.10 inch thick. Substantially identical polarized piezoelectric ceramic crystals, 56 and 58, having opposed planar surfaces, are cemented on each side of inert element 54 by a conductive high-temperature epoxy. The positive face of crystal 56 and the negative face of crystal 58 are exposed to the acoustic coupling fluid that commonly fills a compartment such as 48. It is important to mount substantially identical crystals on each side of inert element 54 in order to maintain front and back mechanical symmetry. That is necessary so that the pattern of the radiated wavefield will be symmetrical, front-to-back, with virtually no side lobes. The inert element 54 is firmly secured at each end to clamping fixtures 59 and 61, which are an integral part of the opposite end portions 50 and 52 of compartment 48 of module 34. The ends are fastened to the fixtures 59 and 61 by bolts 60 and 62 or by any other convenient means. Leads 64 and 66 provide means for applying a trigger signal to activate the bender-bar driver transducer such as 40. A laterally-disposed Janusian window 68 is provided for each dipole compartment (FIG. 3). The opposite sides of window 68 are sealed by covers 70, 72 of any well-known acoustically-transparent material such as rubber or fiberglass. A septum 74 separates opposite sides of the window 68 for reasons that will be discussed later.

Figure 9:
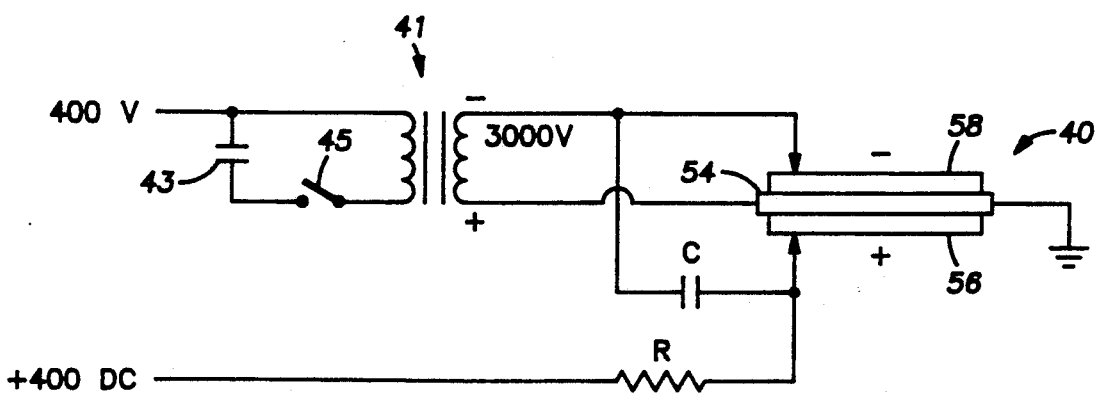
FIG. 9 is a wiring diagram of the firing circuit of the dipole transmitter driver unit.

In operation, a trigger-pulse signal, on the order of 3000 volts, is applied at 500-millisecond intervals to a bender-bar driver transducer such as 40 as indicated by the circuit diagram of FIG. 9. The source of the trigger signal may be either the sonde-mounted electronics 25 or the surface electronics 23. A charged capacitor 43 is discharged, upon command, through switch 45 which may be an FET, to generate an electrical trigger pulse. Application of a trigger pulse through transformer 41 causes the dipole unit to abruptly snap laterally in one direction as shown symbolically in FIG. 3B to generate a differential-pressure wave field in the coupling fluid that fills compartment 48. Propagating from the sonde 16 through the fluid in borehole 10, the differential-pressure wave field excites an asymmetrical flexural waves 63 and 65 in the borehole sidewall 30. That wave field takes the form of a compressional (positive) acoustic radiation field that propagates through one portion of Janusian window 68 along a selected azimuth 57 and a concomitant rarefaction (negative) radiation field that propagates along the complement 59 of azimuth 57 through the opposite portion of the Janusian window. The septum 74 serves as a baffle to prevent mutual interference between the two radiation fields. The principle lobes of the positive and negative radiation fields are directed orthogonally to the planar surfaces representing the principle axes of the dipole unit. By reason of the preferred mounting method of the dipole unit, the entire mass of the sonde provides an effective inertia mass against which the dipole unit reacts when driven by the trigger signal thereby to create a much more powerful acoustic wavefield than would otherwise be possible.

Figure 4:
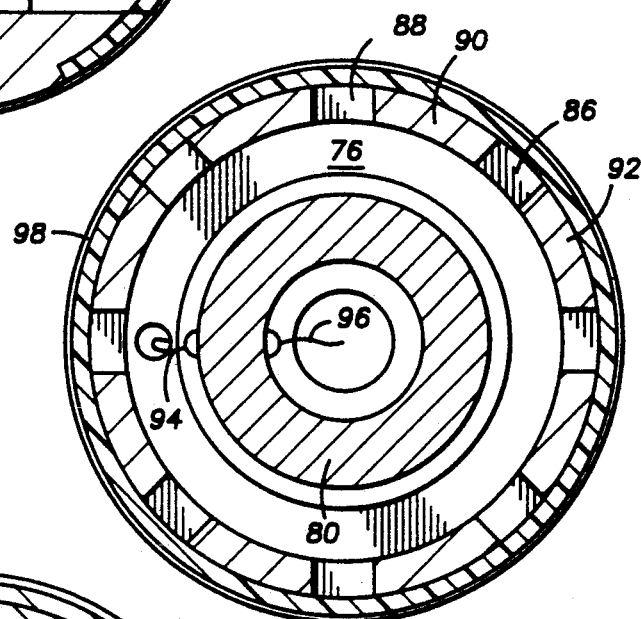
FIG. 4 is a cross section along lines 4—4 of FIG. 2A.

Refer now to FIGS. 2A, 2B and also to FIG. 4, which is a cross section along line 4—4 of FIG. 2A. Compartment 76 in module 34 and compartment 78 in module 36 contain monopole driver units 44 and 46. The units are substantially identical so only one will be described in detail. The monopole unit consists of a conventional cylindrical expander-type polarized piezoelectric ceramic element 80 that is secured by any convenient means to mounting pads 82 and 84 formed from any desired material. That portion of module 34 that forms the wall of compartment 76 is longitudinally slotted around its entire perimeter. The slots such as 86 and 88, form openings (FIG. 4) which are separated by a plurality of longitudinally-disposed slats such as 90 and 92 that are provided for structural integrity of the module. Electrical leads 94 and 96 provide means for applying a periodic trigger pulse from a suitable signal source which may be located in module 25 in the sonde or from electronics module 23 at the surface to monopole unit 80. An acoustically transparent sheath 98 of suitable material such as rubber or fiberglass seals the slotted openings. When excited by an electrical trigger pulse, monopole unit 44 emits an omnidirectional, axially-symmetrical compressional wave field that propagates through the slotted openings, through the borehole fluid, to uniformly irradiate the borehole sidewall 30 for generating compressional waves and converted shear waves therein. For obvious reasons, the axial orientation of the monopole unit is immaterial.

Figure 6:
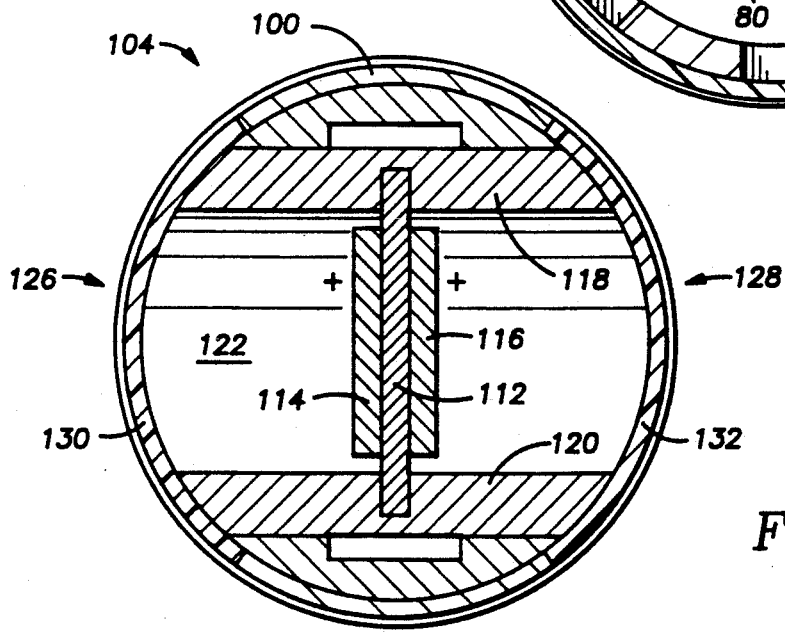
FIG. 6 is a cross section along line 6—6 of FIG. 5.
Figure 5A:
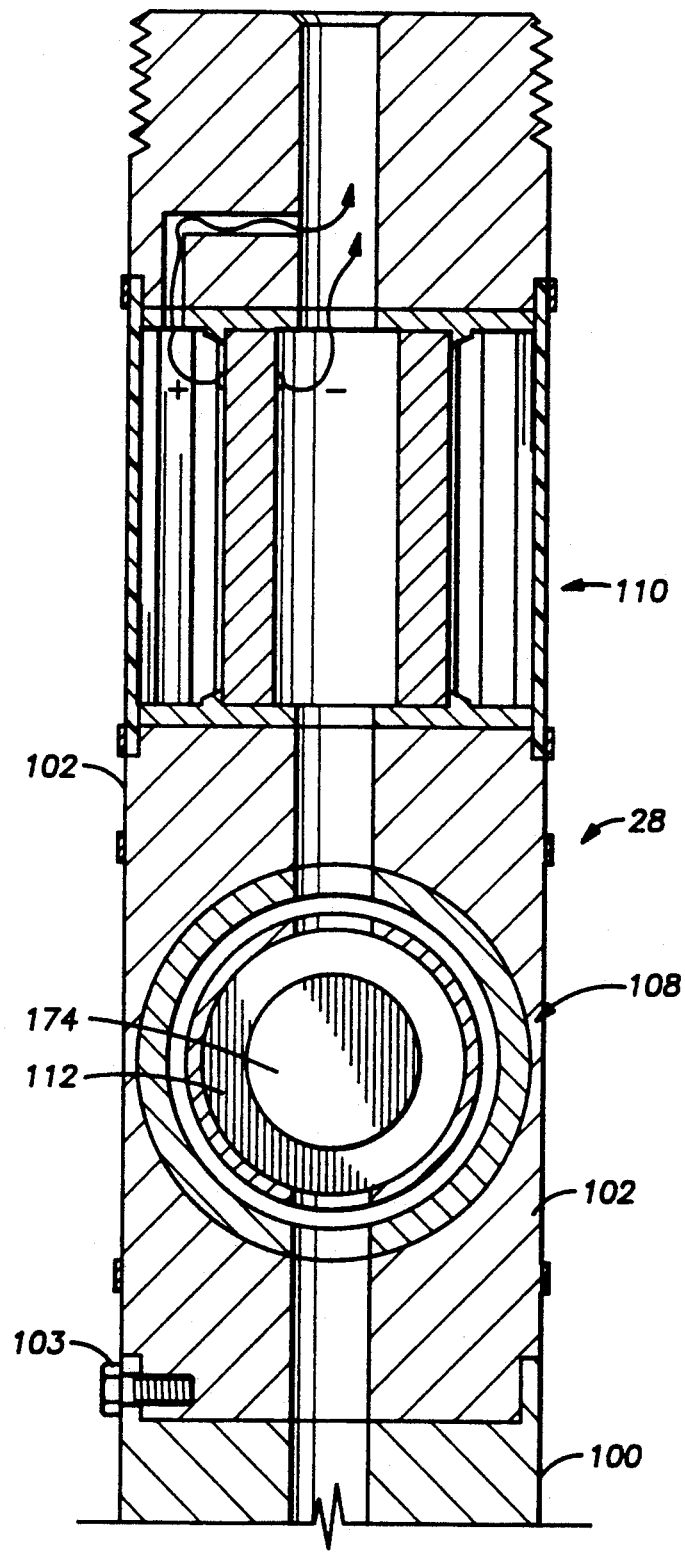
FIGS. 5A and 5B show the construction of the receiver assembly.
Figure 5B:
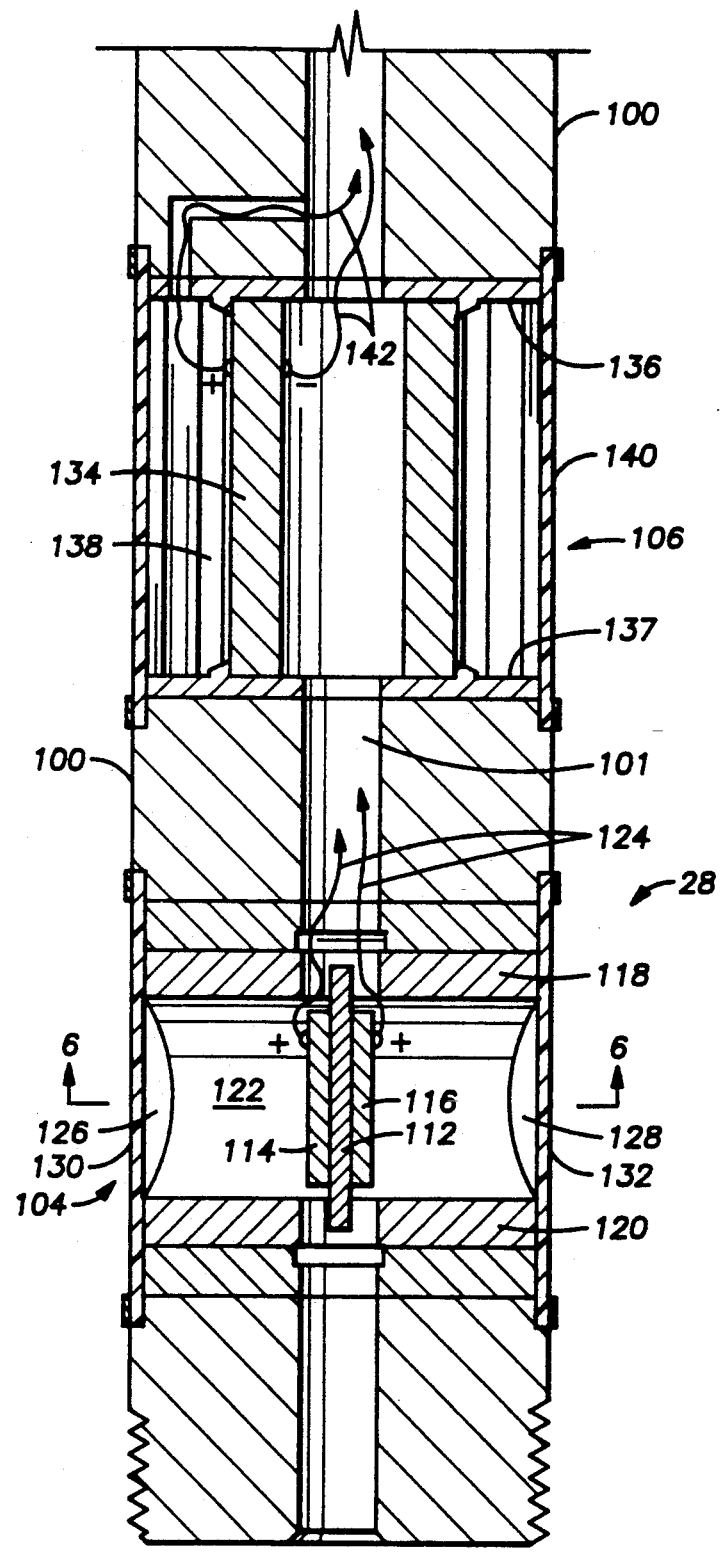

The receiver assembly 28 of this invention consists of two stainless steel segments or mandrels 100 and 102 of the same diameter as that of the transmitter assembly. An internal longitudinal bore 101 is provided the same as for the transmitter assembly. With reference to FIGS. 5A, 5B and 6, the two mandrels 100 and 102 are axially rotatable relative to each other and may be locked into place by any desired means such as by one or more locking bolts such as 103. Each mandrel includes a plurality of compartments for containing a plurality of dipole receiver transducers such as 104 and 108 and a plurality of monopole receiver transducers such as 106 and 110 (dipole receivers and monopole receivers for short). The compartments are filled with an acoustic coupling fluid. In FIGS. 5A and 5B, one dipole receiver and one monopole receiver are shown in each mandrel but preferably arrays of at least four or more of each type of receiver may be used in each mandrel. In FIG. 5, the receivers 104 and 106 are shown rotated 90° with respect to receivers 108 and 110 but they may optionally be rotated in axial alignment with each other. Receivers of like types are spaced about six inches apart. The entire receiver assembly may be on the order of ten feet long. Each end of the receiver assembly unit is threaded (not shown) for mating to other assemblies that make up the sonde.

Dipole receivers 104 and 108 are substantially identical ceramic flexural-disk transducers. The receiver element consists of an inert diaphragm 112 on each side of which are cemented polarized ceramic piezoelectric disks 114 and 116. The polarity of the outwardly-facing planar surfaces of the piezoelectric disks are positive as indicated in FIGS. 5A and 6; the inner faces are grounded. The receiver elements are fastened to mounting fixtures such as 118 and 120 in a compartment such as 122. Electrical leads 124 conduct the dipole receiver signals to a suitable multi-channel signal utilization device 23 of any well-known type. Compartment 122 is furnished with oppositely-disposed acoustic windows 126 and 128 that are sealed by acoustically transparent covers 130 and 132. Because of their dipole construction, the dipole receivers are binaurally sensitive only to differentially-applied pressure wavefields, which cause bending of the active element in one direction, such as are produced by flexural waves. They are unresponsive to an axially-uniform compressive wavefield by reason of the direction of polarization of the piezoelectric bender elements.

Monopole receivers 106 and 110 are conventional expander-type cylindrical polarized ceramic piezoelectric transducer elements such as 134, of substantially the same construction as the monopole transmitter units. Since they are identical, only receiver 106 will be described. Active element 134 is supported by mounting fixtures 136 and 137 inside its compartment 138. The walls of compartment 138 are slotted and sealed by an acoustically transparent material 140. Electrical leads 142 conduct the monopole receiver signals to a signal utilization device 23, FIG. 1 of conventional type through bore 101. The monopole receivers 106 and 110 are responsive to an axially-symmetrical uniformly-applied pressure wavefield because they respond to compression and expansion. But they are not sensitive to a differential-pressure field. As with the monopolar transmitter units, the azimuthal orientation of the monopolar receivers is not of concern.

Figure 8B:
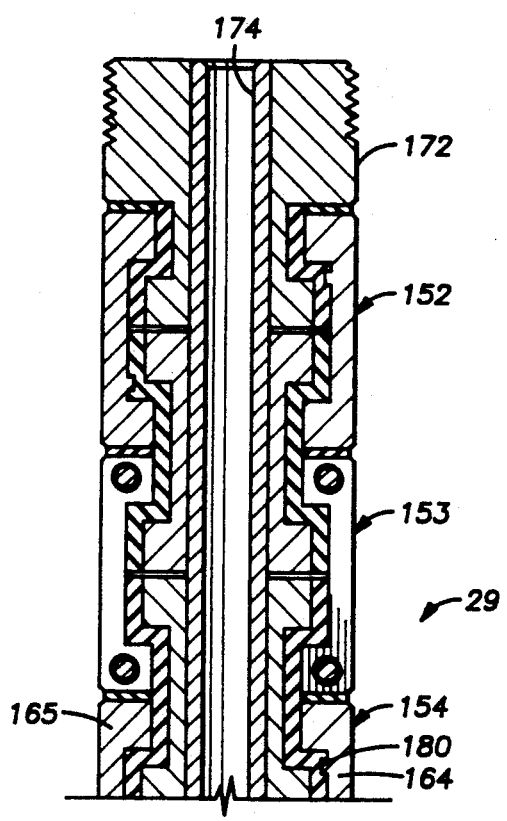
FIG. 8B is a showing of a spool section.
Figure 8B:
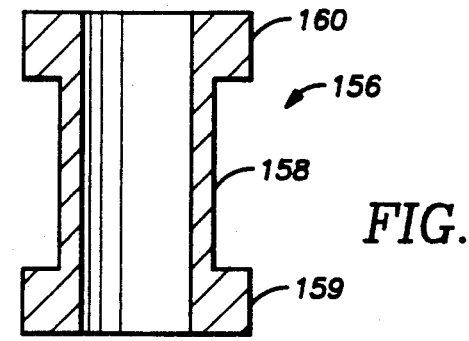
Figure 7:
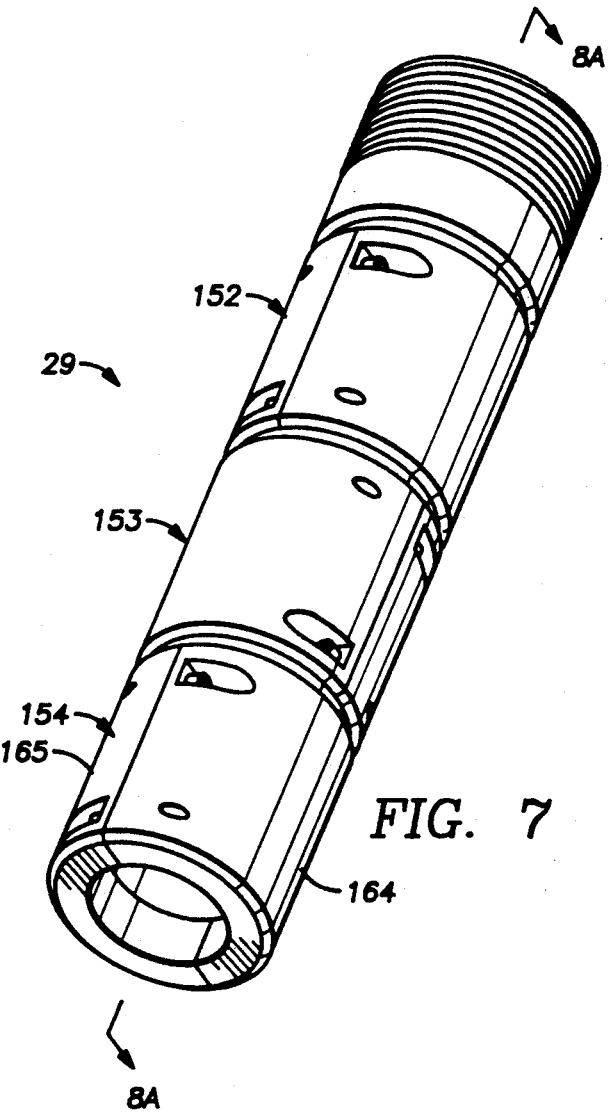
FIG. 7 is an external isometric view of the acoustic isolator.
Figure 8A:
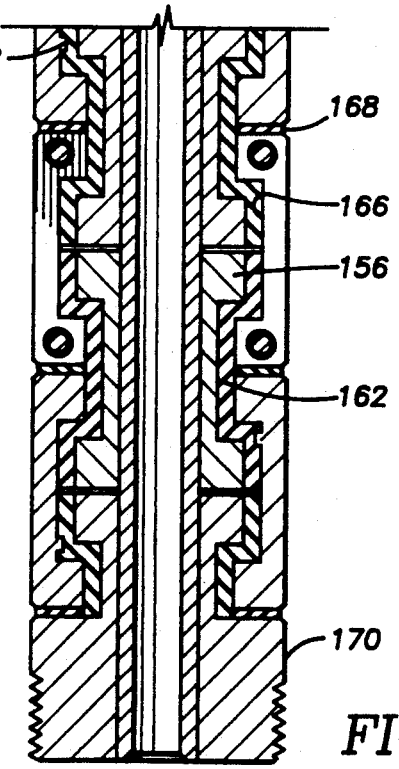
FIG. 8A is a cross section along lines 8A—8A of FIG. 7.

The transmitter assembly 26 is separated from the receiver assembly 28 by an acoustic isolator 29, as shown in FIG. 1, so that the acoustic signals radiated by the transmitters will not travel directly up the body of the sonde 16 to interfere with arriving formation signals. The isolator section 29 has a diameter the same as that of the transmitter and receiver assemblies and may be about five feet long. The isolator section 29 of this invention is sub-flexible, i.e. it will bend around curves of moderate radii but it is sufficiently stiff that it can be maneuvered through highly-deviated boreholes without buckling. It is composed of a plurality of interlocking compound vertebrate links 152, 153, 154 such as is partially shown in the external isometric view of FIG. 7 and in FIG. 8A, which is a cross section along line 8A—8A of FIG. 7. A typical compound link includes a hollow spool such as 156 (FIG. 8B) having a shank 158 and expanded opposite end portions 159 and 160. A resilient boot 162 is vulcanized to and covers the shank and expanded end portions of the spool. A plurality of spools are arranged end-to-end, in tandem alignment, there being a first and a last spool. A plurality of paired split-shell sections such as 164 and 165, having an internal recessed portion 166 are provided. Each of the paired split-shell sections, when bolted together, externally embraces the enlarged end portions of two adjacent boot-covered spools as shown in FIG. 8A. A separator washer 168, which may be resilient, provides spacing and clearance between longitudinally-adjacent split-shell sections. The first and last spools are coupled to threaded terminator subs 170 and 172 for connection to the other assemblies, such as the transmitter module 26 and the receiver module 28, that make up the logging sonde 16. In assembling the vertebrate links together, the split-shell sections are alternately rotated 90° with respect to each other as shown in FIGS. 7 and 8A. Each split-shell section pair is keyed by a key such as 180, 182, to the resilient boot 162 that covers the associated spools so that the vertebrate links will not rotate axially with respect to each other. A flexible liner 174 may be inserted through the hollow spools for the passage of electrical signal leads if needed.

In operation, the isolator is secured between the transmitter and the receiver modules of the sonde by the threaded termination means 170 and 172 before the sonde is lowered into the borehole. The resilient boot means that covers each of the spools effectively absorbs any acoustic energy that would otherwise travel up the sonde. From laboratory tests, it has been found that the isolator provides acoustic attenuation on the order of 40 dB or better. The key means provide rotational stability for the sonde as a whole.

In the preceding descriptions, items and techniques that are well known to the art and conventional such as general instrumentation, wiring and electrical connectors between modules and assemblies have not been shown since they are not germane to this invention.

The description has been written with some degree of specificity and is intended to be exemplary only and is not to be taken in any way to be limiting of the scope and spirit of this invention which is limited only by the appended claims.

What is claimed is:

1. A sub-flexible acoustic isolator for use with an acoustic logging sonde, comprising:
   a plurality of vertebrate links, said vertebrate links including:
   a plurality of spools, each having a shank and expanded opposite end portions, said spools being arranged end-to-end in tandem, there being a first and a last spool;
   a resilient boot means for covering the shank and expanded end portion of each said spool;
   a plurality of split shell means for interconnecting said plurality of spools by externally gripping the resilient boot means covering the expanded end portions of each pair of the respective adjacent spools.

2. The isolator as defined by claim 1, wherein:
   the split shell means includes opposite internal recessed end portions for mating with the boot covering the expanded end portions of the respective adjacent spools; and
   a longitudinal passageway through said spools.

3. The isolator as defined by claim 2, comprising:
   termination means secured to said first and last spools for interfacing said acoustic isolator between selected components of a logging sonde.

4. The isolator as defined by claim 3, comprising:
   key means associated with said split shell means and said resilient boot means for inhibiting relative axial rotation between said vertebrate links.

* * * * *